(12) United States Patent
Yeh (10) Patent No.: US 7,516,511 B2
(45) Date of Patent: Apr. 14, 2009

(54) WINDSCREEN WIPER SUPPORTING DEVICE

(76) Inventor: Jih-Hung Yeh, 235 Chung - Ho Box 8-24, Taipei (TW)

( * ) Notice: Subject to any disclaimer, the term of this patent is extended or adjusted under 35 U.S.C. 154(b) by 253 days.

(21) Appl. No.: 11/592,845

(22) Filed: Nov. 6, 2006

(65) Prior Publication Data

US 2008/0104791 A1 May 8, 2008

(51) Int. Cl.
*B60S 1/32* (2006.01)
*B60S 1/34* (2006.01)

(52) U.S. Cl. .............. 15/257.01; 15/250.001; 15/250.19

(58) Field of Classification Search .............. 15/257.01, 15/250.16, 250.001, 250.01, 250.351; 248/688, 248/689, 206.5
See application file for complete search history.

(56) References Cited

U.S. PATENT DOCUMENTS 5,628,084 A * 5/1997 Chen ..................... 15/250.19
6,286,175 B1 * 9/2001 Lee ..................... 15/250.19
6,684,448 B2 * 2/2004 Shih ..................... 15/250.19

FOREIGN PATENT DOCUMENTS

| DE | 3226258 | * | 1/1984 |
| DE | 3325707 | * | 1/1985 |
| DE | 3346845 | * | 7/1985 |
| DE | 3731921 | * | 12/1988 |
| JP | 61-60354 | * | 3/1986 |
| JP | 5-162616 | * | 6/1993 |

* cited by examiner

Primary Examiner—Gary K Graham (57) ABSTRACT

A windscreen wiper supporting device comprises a hollow body, an interior of the body being installed with a retaining shaft; a lower side of the retaining shaft having a first magnetic unit; a second magnetic unit being at a lower side of the first magnetic unit and being within the body; the magnetic polarities of the first magnetic unit and second magnetic unit being identical; the body being formed with a through hole and a fixing hole; and an supporting rod having one end passing through the through hole; the retaining shaft and the fixing hole to be connected to the body; and another end of the supporting rod exposed out of the body so as to form as an supporting portion. The body has a cover and is installed with a combining seat which has a U shape or an H shape. The combining seat is installed with a nut and a screw.

9 Claims, 11 Drawing Sheets

WINDSCREEN WIPER SUPPORTING DEVICE

FIELD OF THE INVENTION

The present invention relates to windscreen wipers, and particularly to a windscreen wiper supporting device, wherein repulsive property of two magnets of the same polarity is used to avoid the operation mistake of the windscreen wiper. The manufacture of the present invention is easy and simple. Thereby the lifetime of the present invention is long and the cost is low.

BACKGROUND OF THE INVENTION

It is often that the windscreen wiper cannot effectively clean the glass of a car. This is because the rubber strip on the windscreen wiper deforms due to the sunlight and rain.

Figure 1:
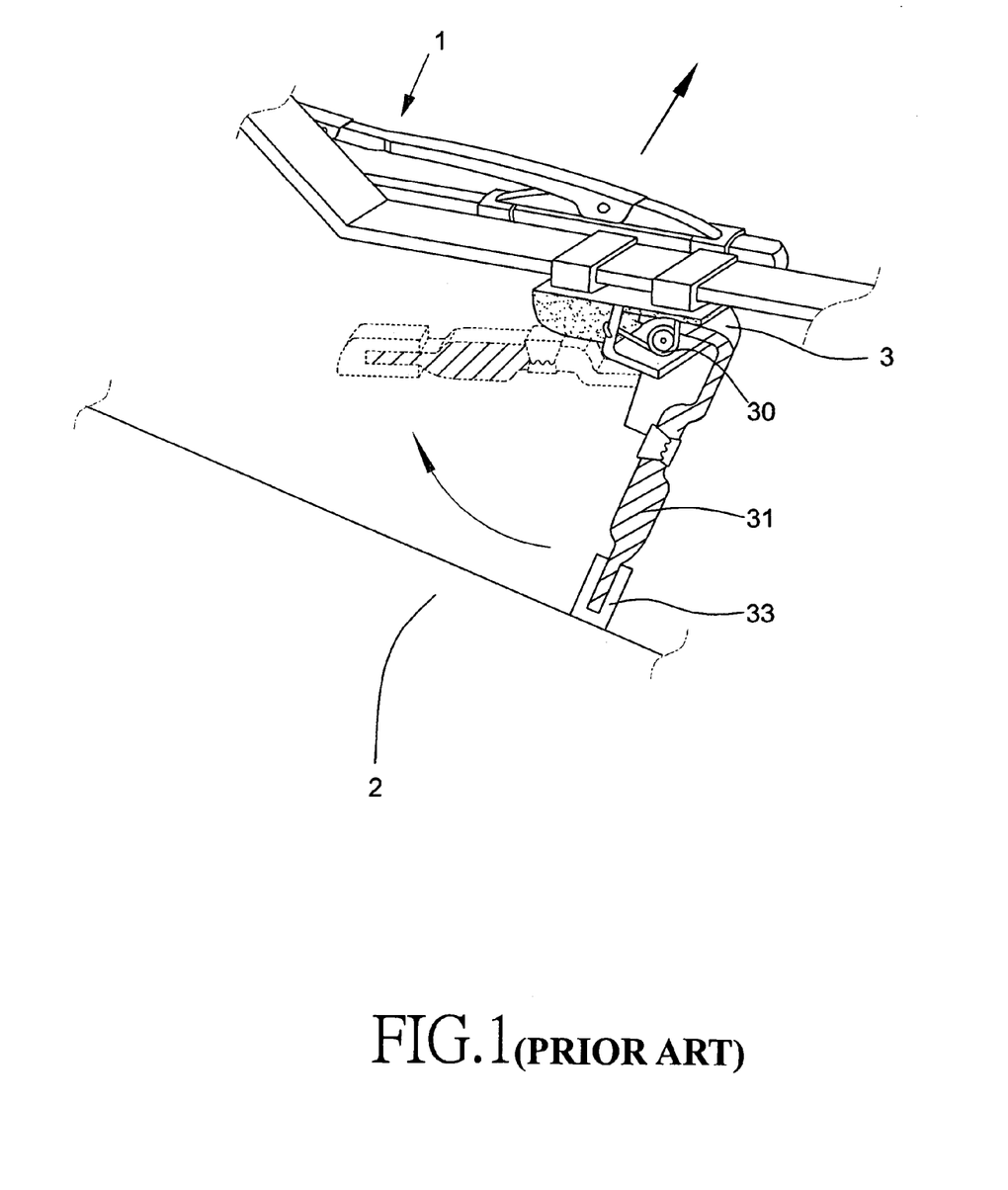
FIG. 1 shows the use of prior art.

To improve-above mentioned problem, the windscreen wiper supporting device is developed. One of such prior art is illustrated in FIG. 1. The supporting device includes a body 3, a spring 30, an supporting unit 31, etc. When the windscreen wiper 1 is not used. The ejection unit 31 moves to the lower side of the windscreen wiper 1. By the pressing force of the windscreen wiper 1 and the friction force between the cover 33 and the glass 2, the body 3 and the supporting unit 31 will support the windscreen wiper 1 so that it will not eject out. Thus the windscreen wiper 1 separates from the glass 2 so as to protect the windscreen wiper 1 from destroy. On the contrary, when it is desired to use the windscreen wiper 1, the body 3 and the supporting unit 31 will sense the operation force from the windscreen wiper 1, the spring 30 will eject the supporting unit toward a front end of the windscreen wiper 1 so that the supporting unit 31 do not contact the glass 2 and thus the glass 2 will not be scratched.

Above mentioned structure has the following three disadvantages.

As illustrated in FIG. 1, the spring 30 is in tension for a long time, the spring 30 will fatigue and thus the supporting unit 31 can not return to the original position. Thus the glass 2 will be hurt.

Furthermore, the element of the supporting device exposes out. In frigid zone or winter, the device can not work due to the elements freezes, and thus the supporting unit 31 can not work normally and the glass is scratched. However, this will induce accident in driving.

Moreover, see FIG. 1, the prior art windscreen wiper exposes out and thus is easy to rust. For a long time, the element of windscreen wiper will be destroyed and the lifetime thereof is shortened.

SUMMARY OF THE INVENTION

Accordingly, the primary object of the present invention is to provide a windscreen wiper supporting device, wherein repulsive property of two magnets of the same polarity is used to avoid the operation mistake of the windscreen wiper. The manufacture of the present invention is easy and simple. Thereby the lifetime of the present invention is long and the cost is low.

To achieve above objects, the present invention provides a windscreen wiper supporting device, comprising: a hollow body, an interior of the body being installed with a retaining shaft; a lower side of the retaining shaft having a first magnetic unit; a second magnetic unit being at a lower side of the first magnetic unit and being within the body; the magnetic polarities of the first magnetic unit and second magnetic unit being identical; the body being formed with a through hole and a fixing hole; and an supporting rod having one end passing through the through hole; the retaining shaft and the fixing hole to be connected to the body; and another end of the supporting rod exposed out of the body so as to form as an supporting portion. The body has a cover and is installed with a combining seat which has a U shape or a H shape. The combining seat is installed with a nut and a screw.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

The windscreen wiper of the present invention is illustrated. The present invention has the following elements.

Figure 2:
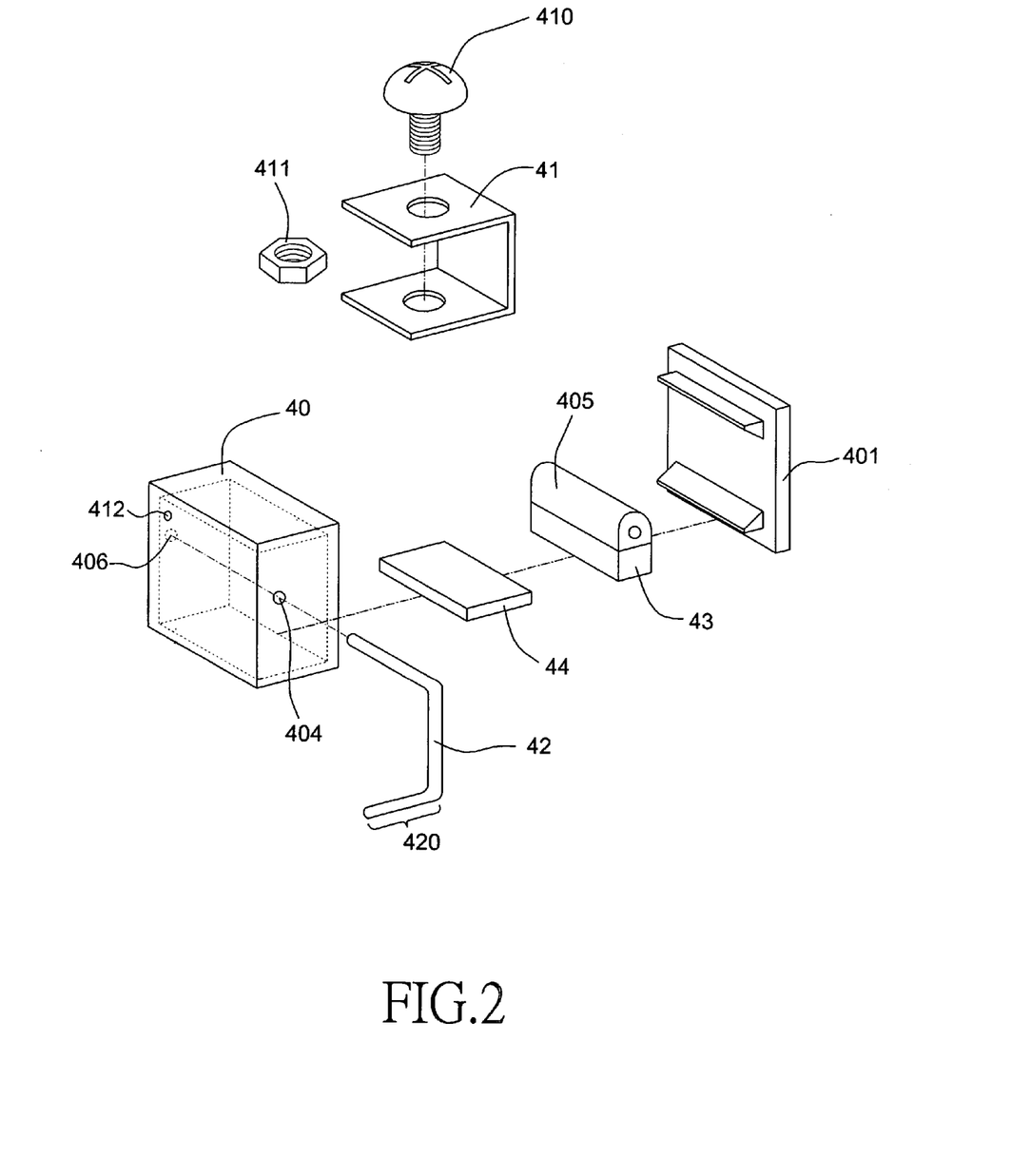
FIG. 2 is an explosive schematic view of the present invention.

A long hollow cubic body 40 is made of transparent acryl or other plastics or other non-transparent material.

A U shape combining seat 41 is installed at the body 40. The combining seat 41 is installed with a screw 410 and a nut 411.

A bent supporting rod 42 has one end passing through the through hole 404 of the body 40, a retaining shaft 405 at the inner side of the body 40 and to a fixing hole 406 at another side of the body 40. Another end of the supporting rod 42 is formed with an ejecting portion 420.

A first magnetic unit 43 is installed at a lower side of the retaining shaft 405 at interior of the body 40. The interior of the body 40 is installed with a second magnetic unit 44 and is below the first magnetic unit 43. The polarity of the second magnetic unit 44 is identical to the polarity of the first magnetic unit 43.

Figure 3:
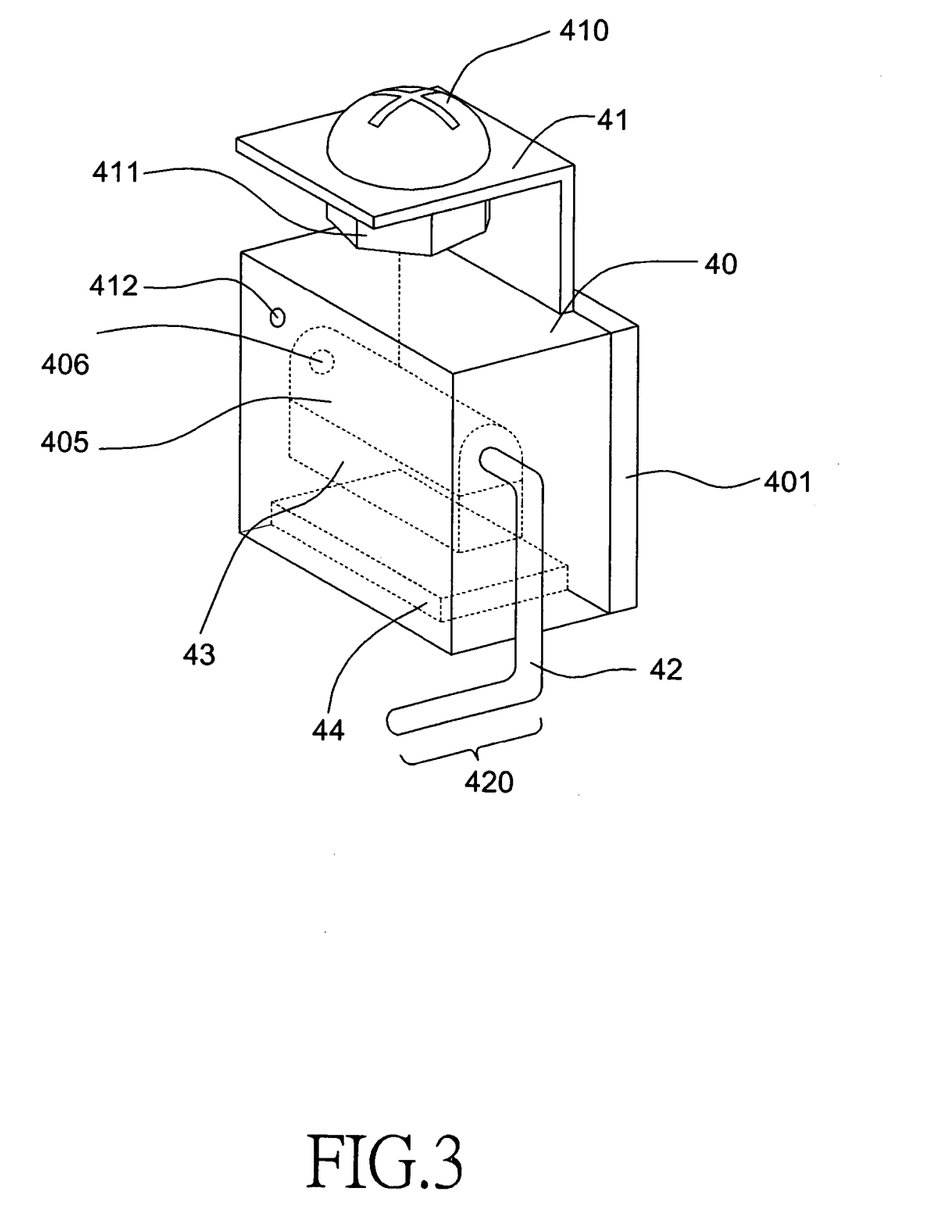
FIG. 3 is a schematic view of the present invention.

In assembly, one end of the supporting rod 42 passes through the through hole 404 and then through the retaining shaft 405 inside the body 40 and then protrudes out of the body 40 from the fixing hole 406. Another end of the supporting rod 42 is bent, as illustrated in FIG. 3. Then the first magnetic unit 43 is adhered to a lower side of the retaining shaft 405. The second magnetic unit 44 is installed in the body 40 and below the first magnetic unit 43. Then a lateral cover 401 covers upon the body 40 so that the body 40 is formed as a cuboid.

Figure 4:
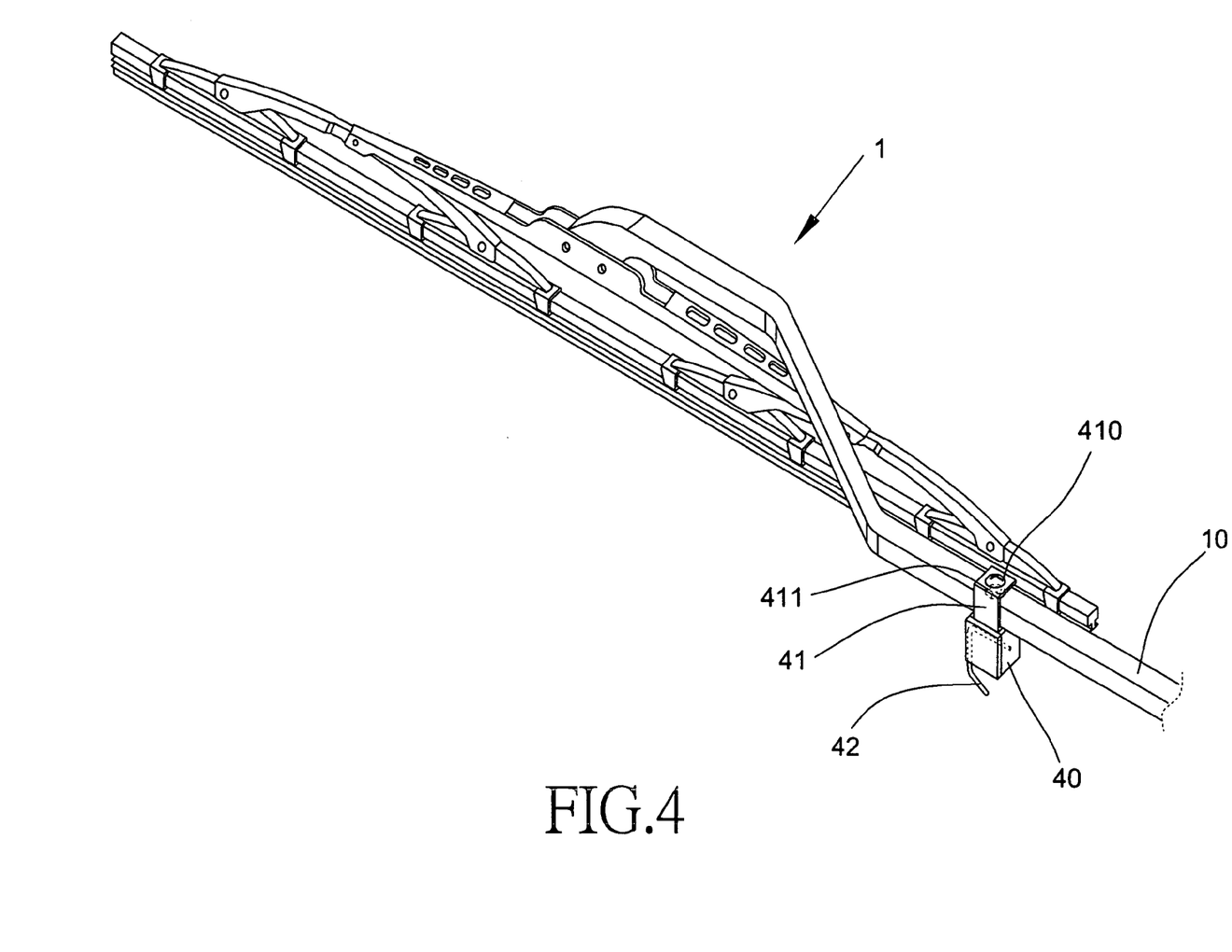
FIG. 4 shows the first embodiment of the present invention.

Referring to FIG. 4, it is illustrated that the present invention is fixed to a windscreen wiper 1. The U shape combining seat 41 is coupled to the windscreen wiper 1 and then the screw 410 is screwed with the nut 411. Thus, the combining seat 41 is fixed to the wiper rod 10.

Figure 5:
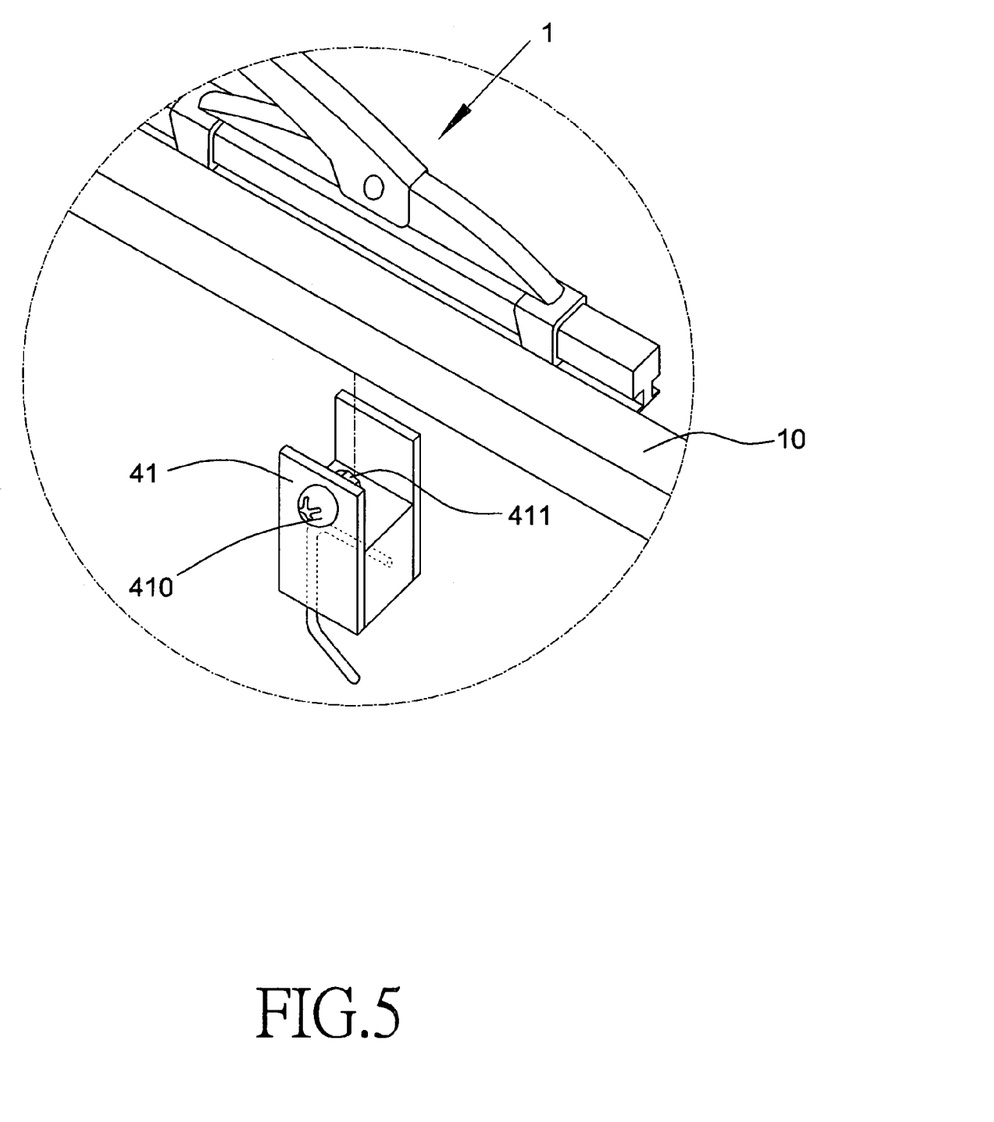
FIG. 5 shows the second embodiment of the present invention.

Referring to FIG. 5, in this embodiment, the combining seat 41 may have an H shape. The H shape combining seat 41 is coupled to the wiper rod 10. Then the screw 410 is screwed to the nut 411 so that the combining seat 41 is fixed to the wiper rod 10. The body 40 can be directly adhered to the wiper rod 10.

Figure 6:
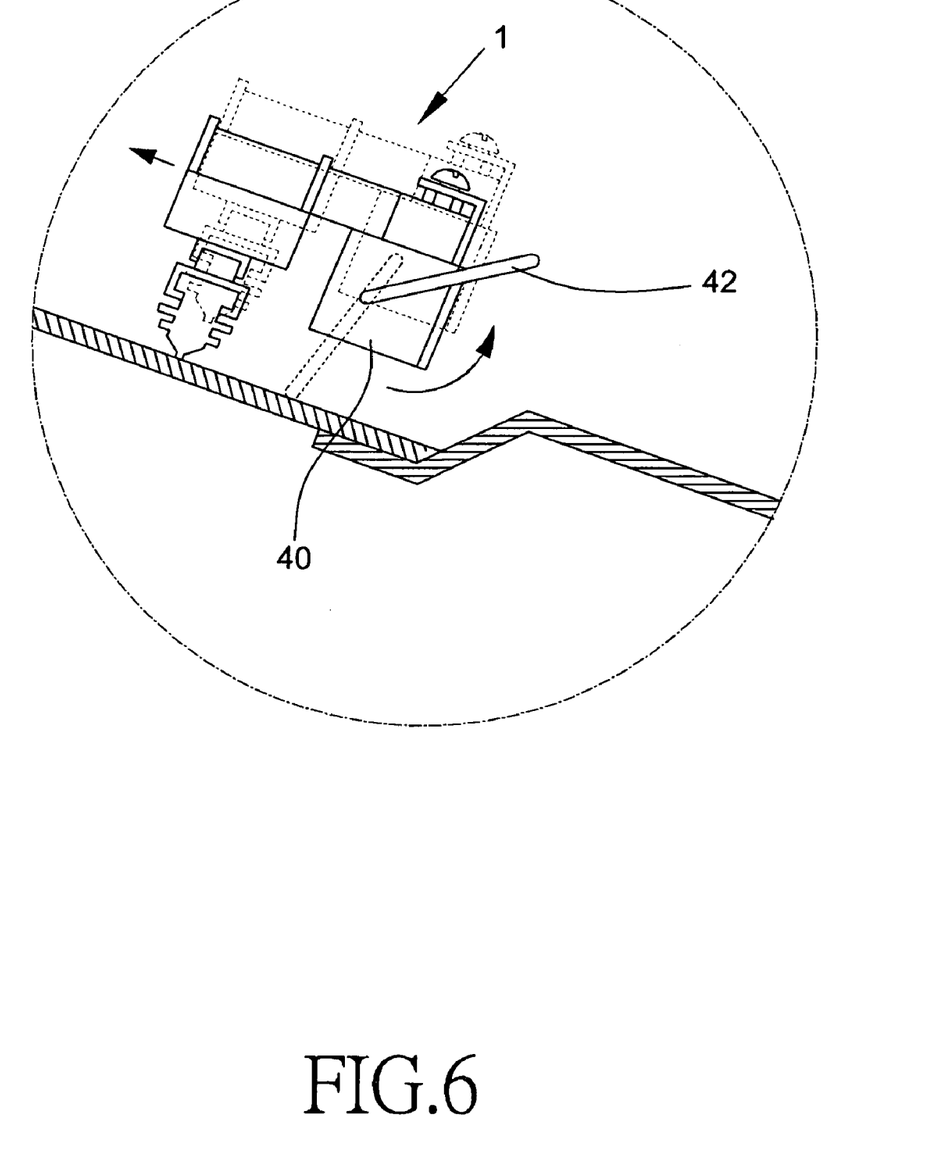
FIG. 6 shows the first application of the present invention.

Referring to FIG. 6, when the windscreen wiper 1 is used. The body 40 and supporting rod 42 will sense the operation force from the windscreen wiper 1. Then the supporting rod 42 will leave from the glass 2 to move along a path opposite to that of the windscreen wiper 1.

Figure 7:
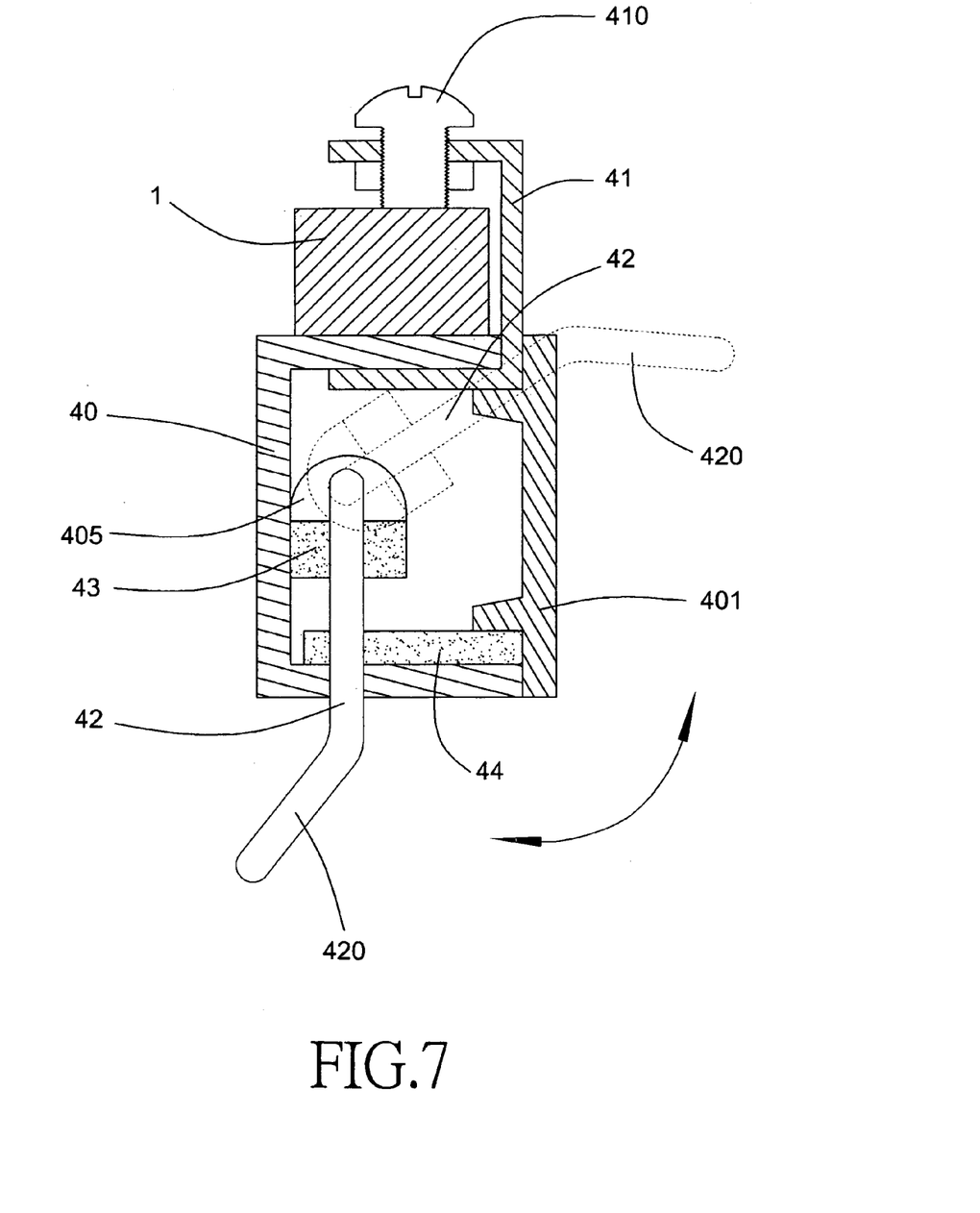
FIG. 7 shows the second application of the present invention.

Referring to FIG. 7, the movement of the windscreen wiper 1 will drive the first magnetic unit 43 below the retaining shaft 405 to move approach to the second magnetic unit 44. By the same polarity of the first magnetic unit 43 and second magnetic unit 44, the first magnetic unit 43 is repulsive to the second magnetic unit 44, the ejecting portion 420 will move upwards rapidly to be aside the combining seat 41. Thus the windscreen wiper 1 can be operated smoothly.

Figure 8:
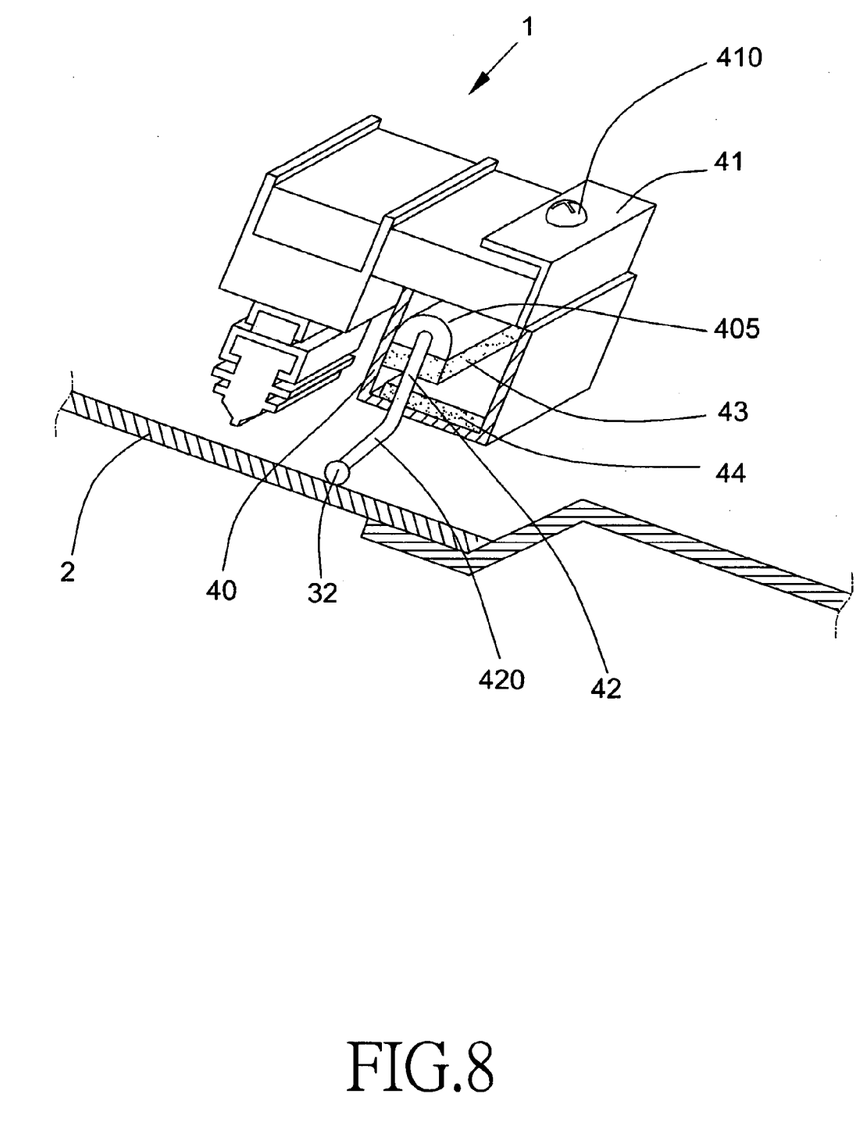
FIG. 8 shows the third application of the present invention.
Figure 9:
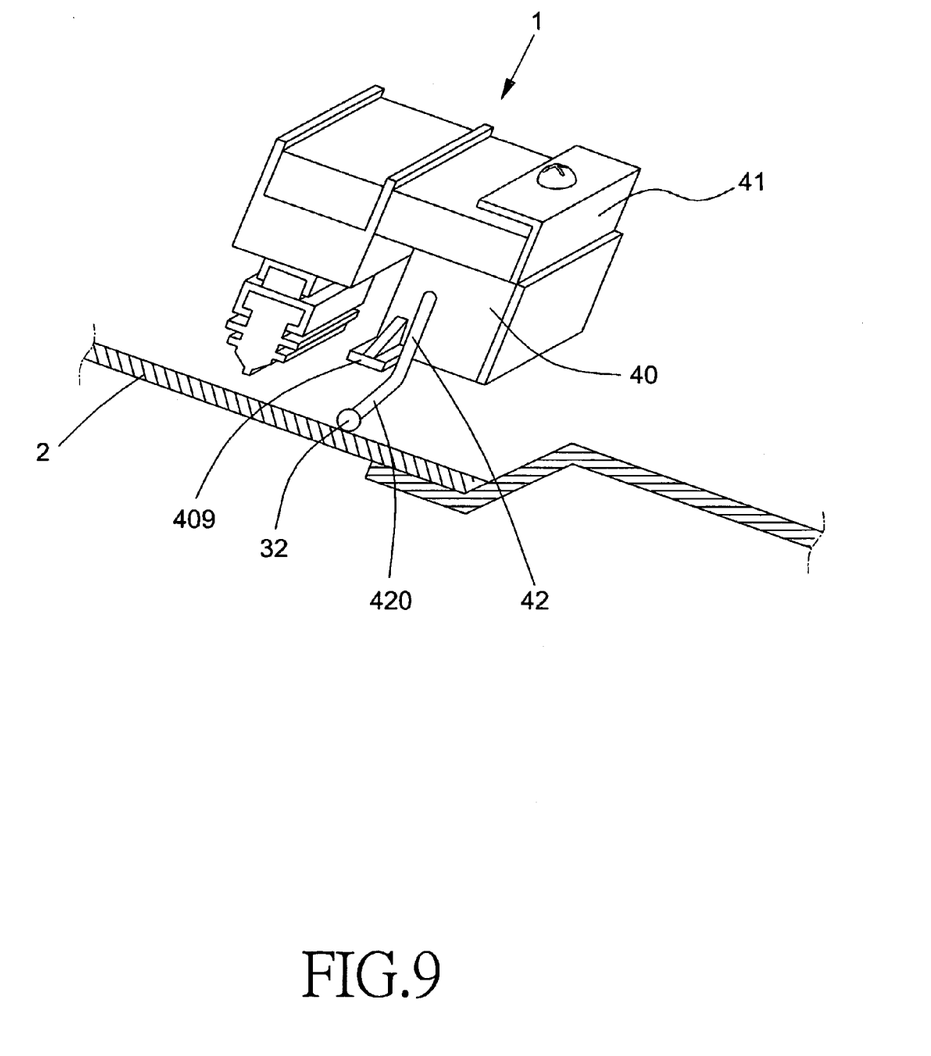
FIG. 9 shows the fourth application of the present invention.

Referring to FIG. 8, when the windscreen wiper 1 is not used, the supporting rod 42 can be moved to be below the body 40. The retaining shaft 405 and the first magnetic unit 43 are installed within the body 40 so as to form a fixing portion of the supporting rod 42. The ejecting portion 420 is supported on the glass 2. As shown in FIG. 9, the supporting rod 42 is moved to be below the body 40 and a positioning block 409 is installed at one outer lateral side of the body 40. The positioning block 409 is tightly adhered to the supporting portion 420 so that the supporting portion 420 is supported upon the glass 2.

Referring to FIGS. 8 and 9, one end of the supporting portion 420 is formed with a protection cover 32 so as to avoid that the glass 2 is scratched when the supporting portion 420 contacts the glass 2. due to the pressing force of the windscreen wiper 1 and the friction force of the cover 32 and the glass 2, the body 40 and the supporting rod 42 will support the windscreen wiper 1 without separation.

Figure 10:
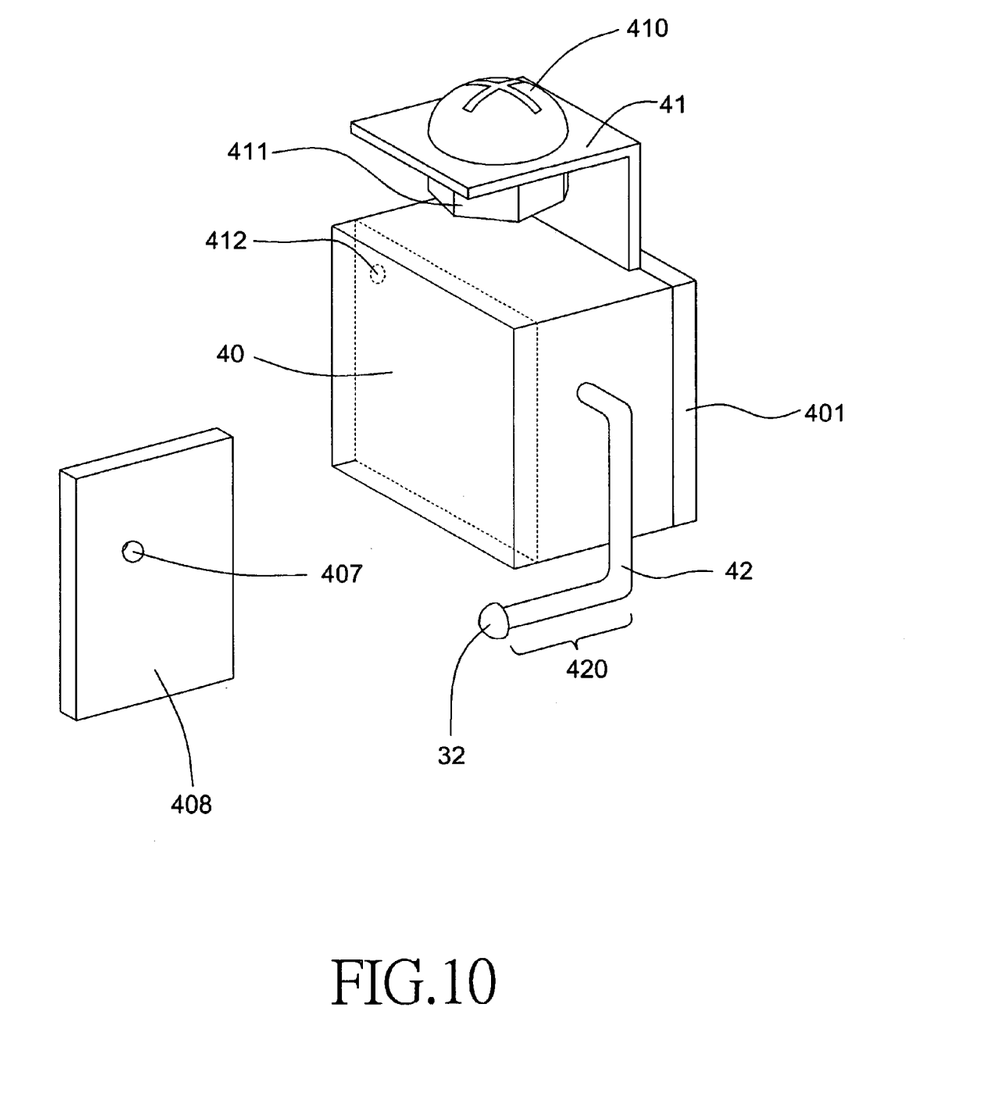
FIG. 10 shows the third embodiment of the present invention.
Figure 11:
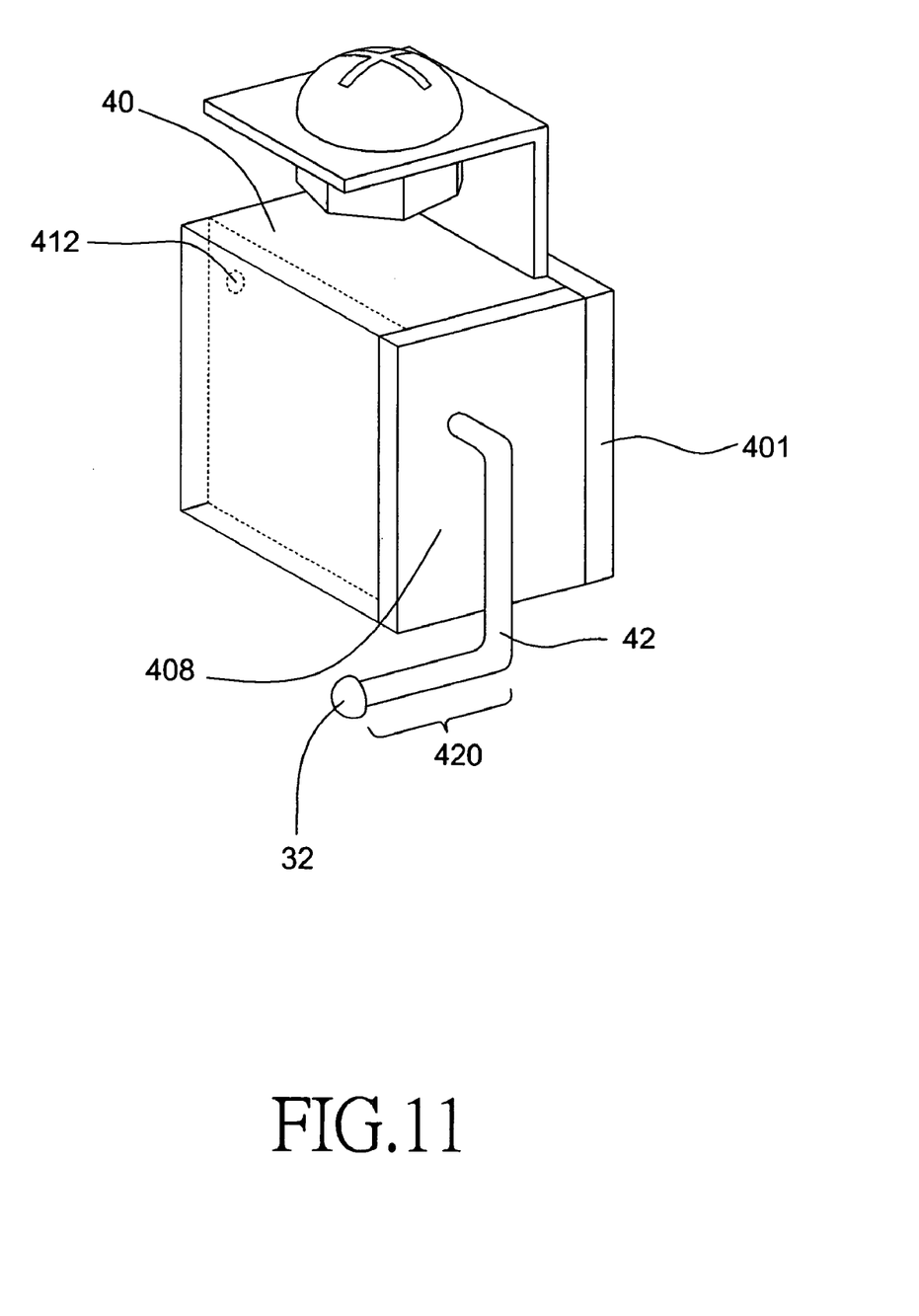
FIG. 11 shows the fourth embodiment of the present invention.

With referring to FIG. 10, in torrid zone, the waterproof cover 408 can be neglected. The present invention can be used normally. Referring to FIG. 11, in frigid zone, a waterproof cover 408 can be placed at one side of the body 40 so as to prevent water drops to permeate into the body 40 and freeze so as to affect the operation of the retaining shaft 405 to induce that the supporting rod 42 cannot eject upwards. The waterproof cover has a hole for receiving the supporting rod before entering into the body. As a result, the glass 2 is not scratched.

With referring to FIG. 11, one side of the body 40 is formed with a via hole 412 for air convection due to thermal expansion and cold contraction. Furthermore, in the present invention, oil is filled into the body. The oil has the effect of lubrication and freezing-proof.

However in the present invention, the repulsive property of two magnets of the same polarity is used to avoid the operation of the windscreen wiper. The manufacture of the present invention is easy and simple. Thereby the lifetime of the present invention is long and the cost is low.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A windscreen wiper supporting device, comprising:
a hollow body, an interior of the body being installed with a retaining shaft; a lower side of the retaining shaft having a first magnetic unit; a second magnetic unit being at a lower side of the first magnetic unit and being within the body; the magnetic polarities of the first magnetic unit and second magnetic unit being identical; the body being formed with a through hole and a fixing hole; and
an supporting rod having one end passing through the through hole; the retaining shaft and the fixing hole to be connected to the body; and another end of the supporting rod exposed out of the body so as to form a supporting portion.

2. The windscreen wiper supporting device as claimed in claim 1, wherein the body has a cover.

3. The windscreen wiper supporting device as claimed in claim 1, wherein the body is installed with a combining seat which has a U shape or a H shape.

4. The windscreen wiper supporting device as claimed in claim 3, wherein the combining seat is installed with a nut and a screw.

5. The windscreen wiper supporting device as claimed in claim 1, wherein the body is installed with an air vent.

6. The windscreen wiper supporting device as claimed in claim 1, wherein the supporting portion has a protection cover.

7. The windscreen wiper supporting device as claimed in claim 1, wherein a waterproof cover is installed at one side of the body and the waterproof cover has a hole for receiving the supporting rod before entering into the body.

8. The windscreen wiper supporting device as claimed in claim 1, wherein a positioning block is installed at an outer side of the body and is in contact with the supporting rod.

9. The windscreen wiper supporting device as claimed in claim 1, wherein oil is filled into the body.

* * * * *